April 28, 1936. A. HERTWIG 2,039,078

MEANS FOR CONSOLIDATING THE GROUND

Filed Oct. 8, 1931

Inventor:
A. Hertwig
By Marks & Clerk
Attys

Patented Apr. 28, 1936

2,039,078

UNITED STATES PATENT OFFICE 2,039,078

MEANS FOR CONSOLIDATING THE GROUND

August Hertwig, Berlin-Charlottenburg, Germany

Application October 8, 1931, Serial No. 567,691
In Germany December 17, 1930

2 Claims. (Cl. 94—48)

The present invention relates to a method of consolidating the ground and foundation soil.

The consolidation of the ground for the laying of foundations, in road work and dam building has been effected till now chiefly by rolling, ramming or tamping, i. e., by pressure and impact. If applied to some kinds of soil, this method will give good results only after water has been added to the ground to be consolidated.

The present invention proposes to utilize the results of modern soil investigation by shaking the material to be made firm, or by simultaneously compressing and shaking it up. The jigging principle has been applied already to concrete and molding sand in casting molds but not to the foundation soil and the ground in earthwork.

According to the invention, the soil to be concentrated is exposed to the action of a machine which, at variable frequency and intensity, causes the soil to be oscillated, whereby all kinds of soil, and particularly those containing much sand, will be consolidated. By adapting the shaking motion to the nature of the soil and the limitations of the latter as to frequency, the consolidation can be increased to an extent representing a multiple of that which is attainable by the existing methods. Furthermore, rolling and shaking may be combined by providing the rollers of known type with a device transforming the entire roller into a machine capable of producing jigging motions as described and of simultaneously pressing and oscillating the soil. This combination of roller and shaking machine may be constructed so that both units may be lifted relative to one another and the shaking machine works with the roller as counterweight.

To regulate the amount of the counterweight, the rollers may be constructed of several removable parts. The periodically acting forces can be produced in the known manner by providing the machine, for example, with two oppositely moving shafts carrying eccentrics, or with hammers actuated by compressed air.

Figure 1:
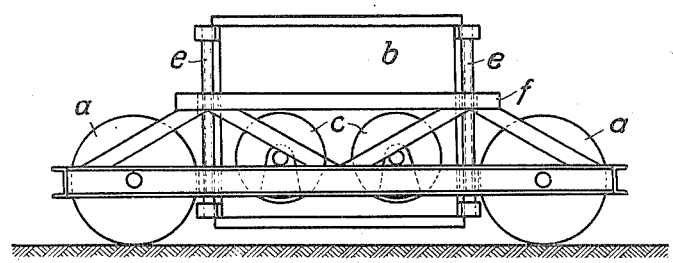
Figure 2:
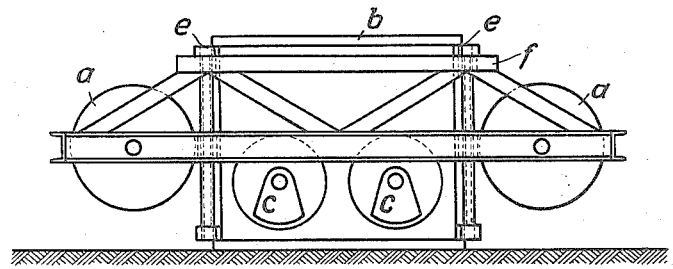
Figure 3:
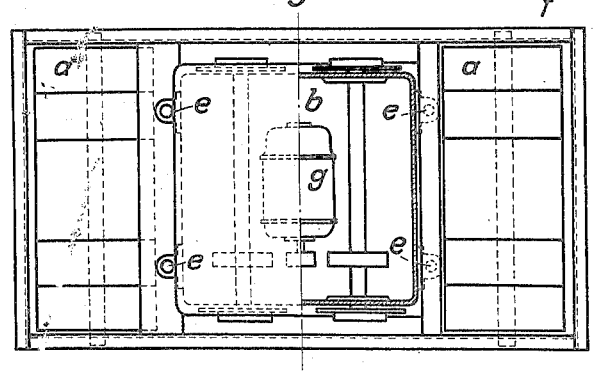

The invention is illustrated in the accompanying drawing, in which Figures 1 to 3 are diagrammatic views of one form of a machine according to the invention.

$a$ are the rollers which may consist of several parts, and $b$ is the shaking machine. The jigging motions may be produced by the oppositely moving eccentrics $c$ variable as to frequency and amount of eccentricity and driven by the electric motor $g$ or another suitable source of energy. The shaking machine $b$ and the rollers $a$ can be adjusted relative to one another by the screws $e$ in the frame $f$ to cause the shaking machine $b$ to rest on the rollers $a$ (Fig. 1) which thus transmit simultaneously pressure and jigging motions to the soil, or to cause the rollers $a$ to rest as counterweight on the shaking unit $b$ (Fig. 2), so that the entire outfit acts as shaking machine. The frame $f$ surrounds the frame $b$ and is in vertical slidable engagement therewith while portions extend beyond the frame $b$ and support the rollers $a$ on opposite ends of the frame $b$.

I claim:—

1. A device for consolidating the ground and foundation soil of roads and the like by the application of periodically acting forces comprising a shaking machine including a frame and unbalanced fly-wheels rotatably mounted thereon and variable as to frequency and amount of eccentricity, heavy rollers, and a secondary frame in which the heavy rollers are supported so as to be rotatable and vertically adjustable relative to the first frame so that the rollers may act as a supporting means for the shaking frame or as counterweights arranged at desired points above the ground and take part of the vibratory action set up by the unbalanced fly-wheels when the shaking frame rests on the ground.

2. A device for consolidating the ground and foundation soil of roads and the like by the application of periodically acting forces comprising a soil shaking machine including a frame, unbalanced fly-wheels rotatably mounted thereon and variable as to frequency and amount of eccentricity, and means for rotating the fly-wheels, a secondary rigid frame surrounding the first frame and having extended end portions, heavy rollers rotatably mounted in the extended end portions of the secondary frame and disposed at opposite ends of the first frame, and means for rigidly and adjustably connecting the frames together for relative vertical adjustable movement so that the rollers may be utilized as a supporting means for the shaking machine or may be arranged at different distances above the ground to act as counterweights and to take part in the vibratory movement of the first frame on the rotation of the fly-wheels when the shaking machine rests on the ground.

AUGUST HERTWIG.